United States Patent Office 3,394,622
Patented July 30, 1968

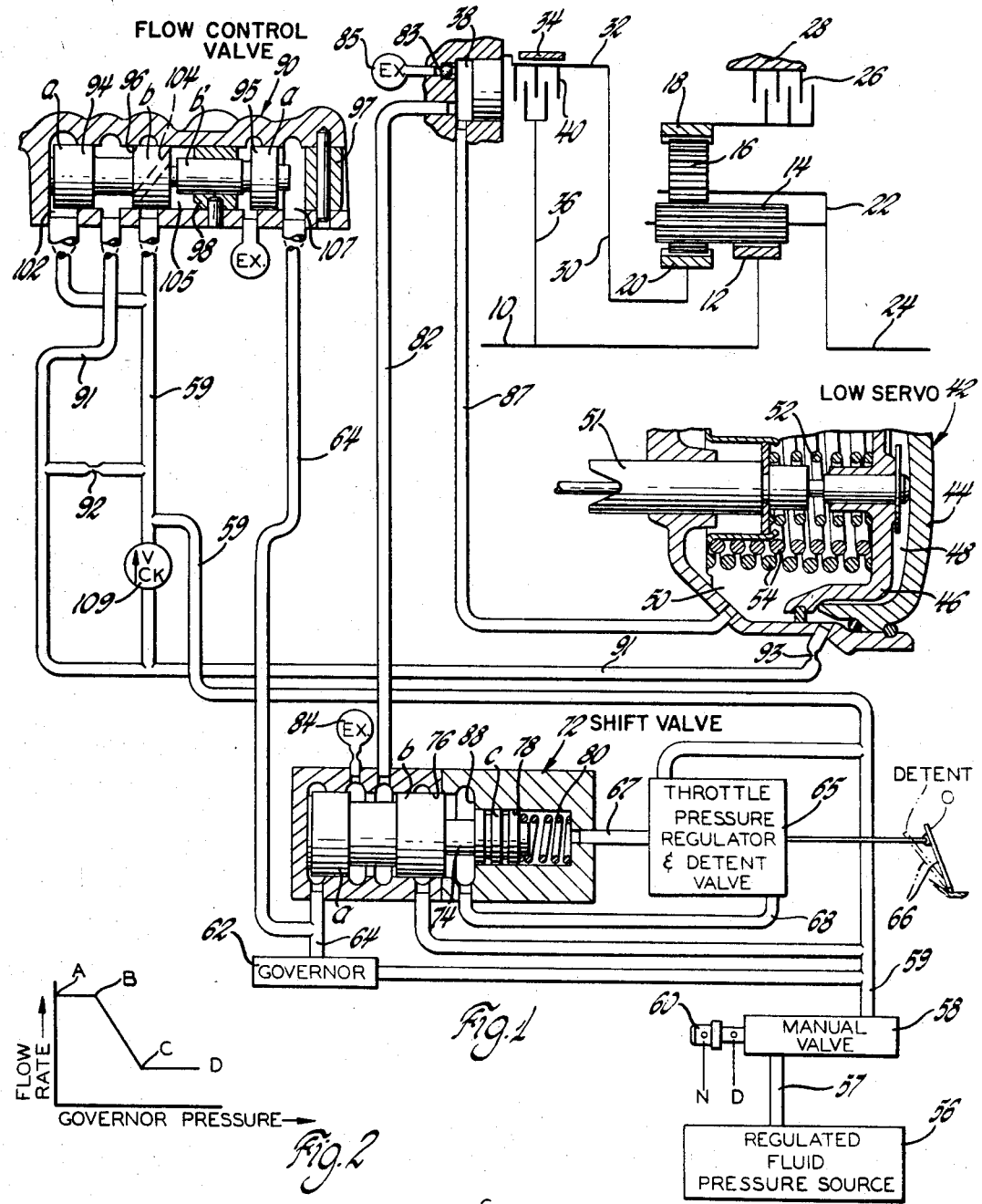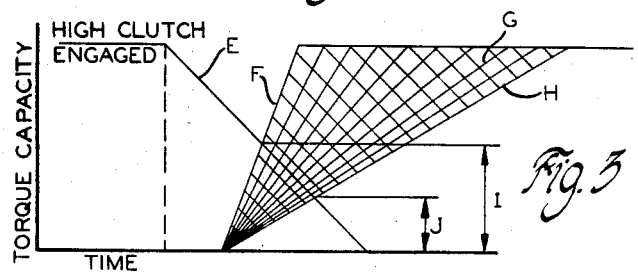

3,394,622
INFINITELY VARIABLE SPEED RESPONSIVE FLOW CONTROL VALVE FOR AUTOMATIC TRANSMISSION CONTROL SYSTEM
Howard E. Chana, Flint, Mich., assignor to General Motors Corporation, Detroit, Mich., a corporation of Delaware
Filed Mar. 30, 1966, Ser. No. 538,726
9 Claims. (Cl. 74—867)

ABSTRACT OF THE DISCLOSURE

A flow control valve conditioned in response to a speed signal establishes an infinitely variable flow rate changing with speed and different flow rates not changing with speed. The infinitely variable flow rate is provided in a speed range intermediate the speeds at which the flow rate does not vary. The flow control valve used in an automatic transmission control system controls the connection to a friction drive establishing servo on a downshift to time the drive establishment with an infinitely variable flow rate and a low and high flow rate dependent upon governor pressure.

---

This invention relates to flow control valves and more particularly to speed responsive flow control valves for use in transmission control systems.

In the preferred embodiment the flow control valve according to this invention controls the connection between a regulated fluid pressure source and a friction drive establishing servo of an automatic transmission control system to provide a fluid flow rate to the servo which decreases with increasing speed to provide smooth transmission downshifts. The valve comprises a pair of spool valve elements having their opposite ends acted on by upstream regulated drive line pressure and governor pressure and juxtaposed ends acted on by damped downstream servo apply pressure which is regulated by one valve element; the other valve element boosting the regulated servo apply pressure with decreasing speed. The flow control valve is connected to bypass an orifice connecting the drive line and servo and provides a linearly variable flow rate between an open and closed position so that the flow rate to the servo is highest at low governor pressure or speed and decreases with increasing speed to a minimum over an intermediate speed range. The servo is engaged at the fastest rate in the low speed range and at a rate which linearly decreases with increasing speed to a minimum in the high speed range so that the torque capacity overlap on downshifts is decreased with increased speed.

An object of this invention is to provide a flow control valve for effecting an infinitely variable flow rate dependent on speed.

Another object of this invention is to provide a flow control valve in an automatic transmission control system for controlling the connection between a source of fluid pressure and a servo to supply fluid at an infinitely variable flow rate which decreases with increasing speed to provide a torque capacity overlap on downshifts which is infinitely variable and decreases with increasing speed.

These and other objects of the invention will be more apparent from the following specification and drawing in which:

FIGURE 1 diagrammatically shows a transmission gearing arrangement with a transmission control system having the flow control valve incorporating the features of this invention.

FIGURE 2 graphically shows the flow control valve's general characteristics.

FIGURE 3 graphically shows the general downshift characteristics.

TRANSMISSION GEARING ARRANGEMENT

The transmission gearing arrangement shown in FIGURE 1 has an input shaft 10 connected to drive a sun gear 12. Sun gear 12 meshes with a long pinion 14 in mesh with a short pinion 16, pinion 16 being in mesh with a controlled ring gear 18 and a controlled sun gear 20. The long pinion 14 and the short pinion 16 are mounted on the pinion shafts of a carrier 22 connected to drive an output shaft 24. The ring gear 18 is connected to be retarded by a friction plate brake 26 mounted on transmission housing 28, the brake 26 being operated by a fluid servo, not shown, to provide reverse drive. The sun gear 20 is connected by hub 30 to a drum 32 which may be retarded by a band brake 34 to provide a low, forward speed drive. When fluid pressure is supplied to a high servo 38 retained in drum 32 to engage friction clutch plates 40 located between drum 32 and a hub 36 connected to input shaft 10, hub 36 drives drum 32 to cause the sun gear 20 to rotate with shaft 10 for a high, forwardspeed drive (direct drive) in the gear set.

The low band 34 is engaged by a low servo 42 having a housing 44 which is divided by a piston 46 into an apply chamber 48 and a release chamber 50. The piston 46 is mounted on a piston rod 51 for limited axial movement and the spring 52 lightly cushions the transfer of the apply force from the piston to the piston rod during initial piston movement while the springs 54 control the rate of apply during band engagement and provide a release force. Movement of the piston and piston rod to the left, as viewed in FIGURE 1, will engage band 34 through conventional linkage not shown.

CONTROL SYSTEM

Fluid supply

A regulated fluid pressure source generally denoted at 56, which may be provided by a conventional input driven pump having a sump collecting the control system's exhausts and regulated by a conventional regulator valve, supplies a main line 57.

Manual valve

A manual valve 58 controls the connection between main line 57 and a drive line 59 and has a valve element 60 which in a Neutral position (N) blocks main line 57 and connects drive line 59 to exhaust and in a Drive position (D) connects main line 57 to drive line 59 and closes the exhaust. Drive line 59 is always connected to low servo apply chamber 48 as explained in detail later.

The connection at the manual valve for delivering main line pressure to operate the reverse brake 26 is not shown since it is not necessary for demonstrating the features of the invention.

Governor

A conventional governor 62 is supplied with fluid by the drive line 59. Governor 62 is driven at a speed proportional to the speed of the driven shaft 24 to provide in a governor line 64 a pressure proportional to driven shaft speed.

Throttle pressure regulator valve and detent valve

A throttle pressure regulator valve and detent valve generally denoted at 65 is supplied with fluid by the drive line 59 and translates load and torque demand from the throttle position of engine throttle 66 and governor pressure in line 64 into a TV pressure in a TV line 67, which pressure increases with increasing throttle opening and decreasing speed and may be equal to drive line pressure at full throttle. Valve 65 also connects TV pressure to a detent line 68 when throttle 66 is through the detent position shown, the detent valve normally exhausting detent line 68 and blocking TV pressure at all lower throttle positions including the zero throttle position shown. Valve 65 may be of the type shown in Hause 3,108,493, entitled "Transmission."

Shift valve

A shift valve 72 controls the shift from low to high drive and comprises a shift valve element 74 having large lands a and b mounted in a valve body bore 76 and a small land c mounted in a bore 78, land b having a slightly larger diameter than land a to provide a hysteresis effect for holding the shift valve element in an upshift position. Governor line 64 is connected to the closed left end of bore 76 to deliver governor pressure to act on the end of land a to tend to upshift the valve against the downshift biasing force of a spring 80 bearing against the valve element and valve body and the downshift biasing forces of TV pressure and detent pressure as explained in detail later.

In the downshift position shown, shift valve element 74 connects a high servo apply line 82 serving the high servo 38 to an exhaust 84 and in the upshift position connects drive line 59 to the high servo apply line 82 and connected high servo 38 to engage the high clutch. The fluid supplied to the high servo also flows via a band release line 87 to the low servo release chamber 50 to equalize the pressure on piston 46 so that springs 54 can release the band 34.

A ball check valve 83 provided in the high servo 38 is held closed by high servo apply pressure. Valve 83 is opened by centrifugal force in neutral and reverse to exhaust any fluid pressure in the low servo release chamber 50 and high servo 38 to an exhaust 85. Valve 83 may be of the type shown in Fischer 2,740,512 entitled "Hydraulic Clutch and Relief Valve Therefor."

The shift valve is held in the downshift position against the left end of bore 76 by the force of spring 80 and only TV pressure at and below the throttle detent position which TV pressure is connected by TV line 67 to act on the end of land c. When the proper relationship between speed and throttle opening exists, governor pressure acting on land a upshifts the shift valve to engage high drive and disengage low drive, land b bottoming on step 88 in the upshift position.

Detent line 68 is connected to shift valve element 74 between the lands b and c. When the shift valve element 74 is in the downshift position and detent pressure is made available by detent valve 65 to detent line 68 on passing through detent, this pressure will act on the small additional area provided by the differential area between lands b and c of valve element 74, along with the forces resisting a normal upshift, to hold the transmission in low at higher speeds. After an upshift, with the throttle through detent or a normal upshift and the throttle is then passed through detent, the TV and detent pressure forces provide a force downshift if vehicle speed becomes or is low enough. The hysteresis effect of the shift valve prevents hunting by requiring a slightly lower downshift speed.

High speed timing, flow control valve

The flow control valve 90 which may also be called a high speed timing valve controls low band apply at an infinitely variable rate in accordance with the vehicle speed by controlling the connection between drive line 59 and a low servo apply line 91 connected to the low servo apply chamber 48. The drive line 59 is continuously connected by a passage having an orifice 92 to the low apply line 91 which has a larger downstream orifice 93 located at the low servo. The flow control valve comprises a regulating spool valve element 94 having a pair of equal diameter lands a and b and a separate speed booster valve element 95 having a land a equal in diameter to the lands of valve element 94 and a smaller land b'. The lands a and b of valve element 94 and land a of valve element 95 are slidable on the wall of a valve body blind bore 96 which is closed at the open end by a plug 97. Land b' of valve element 95 is slidable on the bore wall of a sleeve 98 which is mounted in the bore 96 and rigidly secured to the valve body. Drive line 59 is connectable by the regulating valve element 94 to the low apply line 91 for bypass flow in parallel with flow through orifice 92 and is connected to deliver drive line pressure to the closed bore chamber 102 at the left end of valve element 94. The space between lands a and b of valve element 94 for effecting the bypass flow around orifice 92 is connected by a restricted passage or orifice 104 to the closed bore chamber 105 receiving the juxtaposed ends of valve elements 94 and 95 to provide a damped pressure biasing force urging the valve elements apart. The right end of valve element 95 is exposed to the closed bore chamber 107 which is connected to receive the signal pressure provided by governor pressure in governor line 64.

Whenever the low servo piston 46 strokes for low band apply, a pressure drop occurs across orifice 92 and produces forces acting on the flow control valve elements 94 and 95. The highest pressure which is drive line pressure acts to urge valve element 94 rightwardly and the lower apply line pressure in line 91 acts to urge valve element 94 leftwardly and valve element 95 rightwardly while governor pressure acts to urge valve element 95 leftwardly. The pressure drop across the orifice 92 is a function of the pressure responsive areas provided by the lands of the valve elements 94 and 95 which areas are constant and governor pressure which is variable and increases with speed.

At the extreme end points, when governor pressure is low enough to allow both valve elements to be held in their extreme right hand or high flow rate position and fully open the bypass between lines 59 and 91, the pressure drop across orifice 92 is zero and the flow rate to the low servo is determined only by orifice 93 which high flow rate is indicated by the flat curve segment A–B in FIGURE 2. When governor pressure is high enough to hold both valve elements in their extreme left hand or low flow rate position blocking the bypass as shown in FIGURE 1, the pressure drop between lines 59 and 91 is determined by only the orifice 92 and the flow rate to the low servo is determined by the series arranged orifices 92 and 93 which low flow rate is indicated by the flat curve segment C–D in FIGURE 2. Between these extremes the regulator valve 94 in cooperation with the booster valve 95 regulates bypass flow to line 91 by determining the pressure drop across orifice 92 so that the flow rate to the low servo is determined by the variable bypass flow area in parallel with orifice 92 and in series with orifice 93. This intermediate speed range operation provides an intermediate low servo apply flow rate inversely proportional to speed which infinitely variable intermediate flow rate is indicated by the straight line curve segment B–C in FIGURE 2. A check valve 109 is connected to bypass flow control valve 90 when flow is in the reverse direction from low apply line 91 to drive line 59.

Operation

With the manual valve 58 in neutral and the throttle closed, the regulated fluid pressure in line 57 is blocked at the manual valve 58 and the drive line 59 and connected devices are exhausted.

When manual valve 58 is moved from neutral to drive position, the manual valve supplies main line pressure to the drive line 59 for delivery to the fluid to the throttle pressure and detent valve 65, the governor 62 and the shift valve 72 which is held in the downshift position. The drive line supplies fluid to the low servo apply chamber 48 via the flow control valve 90, which at low vehicle speeds in the range A–B is in the high flow rate position with orifice 93 controlling the flow rate. Thus, the low drive is engaged at a desirable fast rate and the vehicle can be accelerated.

With increasing part throttle opening, the throttle pressure regulator valve 65 regulates TV pressure in TV line 67 at proportionately increasing pressures which pressure is directed to act on land c of shift control valve element 74. The shift valve 72 is thus acted on by a downshift force equal to TV pressure multiplied by the area of land c of valve element 74 plus the bias of spring 80. When vehicle speed increases so that governor pressure acting on land a of shift valve element 74 overcomes the spring and TV pressure force, the shift valve moves to the upshift position to connect drive line 59 to the high clutch line 82 and low servo release line 87 to apply the high clutch and release the low brake to provide a part throttle upshift. TV pressure and spring 80 acting against governor pressure and the hysteresis effect of the shift valve provide the normal part throttle downshift.

Further movement of the throttle through the detent position causes the detent valve 65 to deliver TV pressure to detent line 68 to act on the differential area between lands b and c of shift valve element 74 to provide full throttle detent up and down, forced shifts at predetermined speeds, the hysteresis effect of the shift valve providing a slightly lower downshift speed to prevent shift valve hunting.

The general downshift characteristics of the transmission are shown in FIGURE 3 where the full torque capacities of the high clutch and low band brake at full engagement are equal. The high clutch release rate E is constant and the low band apply rate is controlled by the flow control valve 90 to vary from a fast apply rate F maintained throughout the low governor pressure or vehicle speed range A–B to intermediate and infinitely variable apply rates decreasing linearly with increasing speed in a zone G through the speed range B–C to a slow apply rate H maintained throughout the high speed range C–D. Since the low band servo effective feed orifice is variable and the high clutch exhaust orifice at valve 83 is constant, the pressure or torque capacity overlap between the high clutch and low band decreases as the low servo effective feed orifice is made smaller.

In the upshift shift valve position and whenever the biasing forces thereon call for a downshift, the flow control regulating valve element 94 will have been pressure biased to establish the desired flow control metering area for connecting drive line 59 to the low servo. When the biasing forces acting on the shift valve in the upshift position call for the downshift in the low governor pressure range A–B, the flow control valve 90 is positioned in the high flow rate position to determine the fast flow rate A to apply the low band servo 42 at fast rate F and with the largest amount of torque capacity overlap I between high clutch release and low band apply. When governor pressure has increased to the intermediate governor pressure range B–C the flow control valve 90 is conditioned to determine one of the infinite number of intermediate flow rates between A and C to apply the low band servo 42 at an intermediate and different rate for each intermediate speed. With the decreased flow rate to the low servo apply chamber 48, low band apply on the downshift is delayed to time low band apply to high clutch release to provide a smaller overlap torque capacity decreasing with increasing speed which gives a smoother downshift at the intermediate speeds. In the high governor pressure range C–D, the flow control valve 90 will be positioned in the low flow rate position shown to determine the low flow rate C to apply the low band servo at the slow rate H at these high vehicle speeds. With the still decreased flow rate to the low servo apply chamber 48, low band apply on the downshift is still further delayed to time low band apply to high clutch release to provide a still smaller torque capacity overlap J which gives a smoother downshift at the high speeds. Thus, low band apply is timed to high clutch release at fixed rates above and below high and low speeds and at infinitely variable rates decreasing with increasing intermediate speed to smooth the downshifts through the entire speed range to provide good operator feel, particularly for the forced downshifts.

The invention may be modified within the scope of the appended claims.

I claim:

1. A flow control valve comprising an inlet passage; an outlet passage; a passage having a flow restriction connecting said inlet passage and said outlet passage; valve means providing a different flow rate establishing passage connecting said inlet passage and said outlet passage in each one of an infinite number of valve positions and biasing means including speed responsive biasing means operatively connected to said valve means operable to position said valve means in each said valve position and at a different speed.

2. The flow control valve set forth in claim 1 and said valve means having a blocking position for blocking flow through the valve and said biasing means being operable to hold said valve means in said blocking position in a predetermined speed range.

3. The flow control valve set forth in claim 1 and said speed responsive biasing means being operable to increasingly bias said valve means to a lower flow rate position with increasing speed.

4. The flow control valve set forth in claim 1 and said valve means having a pair of valve positions bounding said infinite number of valve positions for determining different flow rates through the valve and said biasing means being operable to hold said valve means in each boundary position in a different and predetermined speed range.

5. A flow control valve comprising an inlet passage; an outlet passage; a movable valve assembly having a regulator valve element movable from an open position providing an open connection between said passages to an infinite number of intermediate valve positions providing different restricted connections between said passages and to a closed position disconnecting said passages; a booster valve element for boosting the movement of said regulator valve element; a restricted connection connecting said passages, said inlet passage being connected to deliver an inlet fluid pressure to bias said regulator valve element to said open position; a restricted connection connecting said outlet passage to deliver damped outlet pressure to bias said valve elements apart and said regulator valve element to said closed position and a speed responsive pressure connected to increasingly bias said booster valve element towards said regulator valve element with increasing speed.

6. In a transmission control system; shift control means for controlling shifting between different ratio drives; shift timing means operable to time the rate of establishment of one drive on disestablishment of another drive and biasing means including speed responsive means operatively connected to said shift timing means for infinitely varying the time rates in relation to speed.

7. In a transmission; a multi-ratio drive unit having fluid actuated ratio establishing means for establishing a low and a high ratio drive; a source of fluid at a regulated pressure; passage means including flow control valve means operatively connecting said source and said ratio establishing means for determining the apply rate of said low ratio drive; shift valve means operatively connected to said source and said ratio establishing means having a low ratio position for establishing said low ratio drive and a high ratio position for establishing said high ratio drive; torque demand means operatively connected to said source and said shift valve means providing a torque demand pressure for increasingly biasing said shift valve means to said low ratio position with increasing torque demand; said flow control valve means providing an effective fast flow rate passage in a fast timing position for timing low ratio drive establishment at a fast rate; an effective variable intermediate flow rate passage in a variable intermediate timing position for timing low ratio drive establishment at an infinitely variable intermediate rate and an effective slow flow rate passage in a slow timing position for timing low ratio drive establishment at a slow rate; said source and said ratio establishing means being operatively connected to said flow control valve means to provide a differential pressure on low ratio drive establishment to bias said flow control valve means from said slow timing position to said intermediate timing positions and then to said fast timing position and governor means operatively connected to said source, said shift valve means and said flow control valve means providing a governor pressure to increasingly bias said shift valve means to said high ratio position with increasing speed and to increasingly bias said flow control valve means from said fast timing position to said intermediate timing positions and then to said slow timing position with increasing speed.

8. The transmission set forth in claim 7 and said flow control valve means comprising a movable valve assembly having a pair of relatively movable valve elements; one of said valve elements having means for determining said effective flow rate passages, a pressure responsive area connected to said ratio establishing means to bias said first valve element to determine larger effective flow rate passages and a pressure responsive area exposed to a fluid chamber connected by a restricted passage to said ratio establishing means to bias said first valve element to determine smaller effective flow rate passages; the other of said valve elements having a pressure responsive area acted on by said governor pressure and another pressure responsive area exposed to said fluid chamber to oppose the bias of said governor pressure so that said second valve element biases said first valve element to determine smaller effective flow rate passages with an effective bias which increases with increasing governor pressure and decreasing fluid pressure delivered to said ratio establishing means.

9. The transmission set forth in claim 8 and said passage means including a restricted passage directly connecting said source and said ratio establishing means.

References Cited

UNITED STATES PATENTS

| | | | |
|---|---|---|---|
| 2,157,472 | 5/1939 | Bellis | 137—54 X |
| 2,713,800 | 7/1955 | Forster | 74—857 |
| 2,769,350 | 11/1956 | Lucia et al. | 74—869 |
| 3,053,116 | 9/1962 | Christenson et al. | 74—752 |
| 3,180,173 | 4/1965 | Fisher et al. | 74—472 |
| 3,230,791 | 1/1966 | Kelley et al. | 74—472 |

FRED C. MATTERN, Jr., *Primary Examiner.*

ARTHUR T. McKEON, *Assistant Examiner.*